# 2,943,970
PAPER PIGMENTS

Edward M. Allen, Doylestown, Ohio, assignor to Columbia-Southern Chemical Corporation, Allegheny County, Pa., a corporation of Delaware No Drawing. Filed Apr. 14, 1959, Ser. No. 806,212

34 Claims. (Cl. 162—181)

This invention deals with precipitated finely divided siliceous pigments. It more particularly concerns siliceous paper pigments effective in enhancing the optical properties of paper.

It has heretofore been appreciated that various properties of paper might be improved by pigmenting and dispersing materials in the paper. Improvement in the optical properties such as opacity and brightness of paper is achieved, for example, by titanium dioxide pigmentation. Due to the cost of titanium dioxide, however, its use for such purposes is generally limited to the more expensive papers such as writing papers. Other less costly materials such as the natural clays and diatomaceous earths are not effective pigments for improving optical properties. Thus, while such materials may be incorporated in paper their value in improving optical properties may be regarded as insignificant and they are not accordingly suitable or advantageously used for such purposes.

By virtue of this invention, finely divided, precipitated, flocculated, essentially amorphous siliceous pigments are provided which when dispersed properly in paper serve to enhance strikingly the optical properties of paper. Thus, these special siliceous pigments are of notable effectiveness in providing paper of improved opacity and brightness. Moreover, these pigments are considerably less expensive than titanium dioxide.

The siliceous pigments, it has been discovered, which are so effective in paper are finely divided, white, inorganic, precipitated, flocculated, essentially amorphous siliceous pigments having an average ultimate particle size less than about 0.25 micron, usually between 0.01 and 0.2 micron. Notwithstanding their extremely small ultimate particle size which would indicate poor paper pigmenting qualities, these pigments are effective by virtue of their state of flocculation. These siliceous pigments are comprised principally of flocs formed from a plurality of ultimate particles and have at least 55 percent, preferably at least 75 percent, by their weight in the form of flocs less than 7 microns, the preponderant weight proportion of such size flocs being in the range of 0.5 to 7 microns.

The extent and nature of the flocculation in these pigments is most important to their paper pigmenting value. Finely divided siliceous materials of less than 0.25 micron, but not properly flocculated, are by comparison ineffective paper pigments.

Flocs which characterize these siliceous pigments are comprised of a multiplicity of very fine ultimate particles agglomerated or otherwise bound together. Under the electron microscope or other high magnification, these flocs bear a visual resemblance to grape clusters, the individual grapes representing the ultimate particle of siliceous material. These flocs are also usually quite porous.

Many siliceous materials include flocs which may be degraded or broken up by strong mechanical grinding. On the other hand, in the preferred pigments, the flocs less than 7 microns in size have their component ultimate particles agglomerated or united with such strength that they resist substantially detrimental deterioration or degradation during those conditions prevailing during the formation of paper and to which the pigment may be subjected. Thus, these pigments are dispersed in paper principally in the form of flocs less than 7 microns in size.

Finely divided, precipitated, white, essentially amorphous, inorganic siliceous materials including silicas and metal silicates such as calcium silicate, aluminum silicate and mixed metal silicates such as calcium aluminum silicate when comprised of flocs less than 7 microns provide useful paper pigments. The more desirable siliceous materials have an average ultimate particle size of about 0.25 micron or less, preferably about 0.025 to about 0.1 micron, with at least 55 percent by their weight in the form of flocs below 7 microns, the preponderant weight proportion of the flocs less than 7 microns being in the size range of from 0.5 to 7 microns.

Siliceous pigments comprised of such small ultimate particles and having 75 percent or more (up to 95 or even 100 percent) of their weight in the form of flocs below 7 microns in size are even better paper pigments. When the preponderant weight portion (at least about 50 percent by weight) of the flocs less than 7 microns in size are in the range of 0.5 to 7 microns, the siliceous pigment is even more effective in paper.

On an anhydrous basis, the siliceous pigments contain at least 50 percent $SiO_2$ by weight with the balance of their composition being principally one or more metal oxides. Thus, chemically the siliceous materials are silica (a composition containing at least 90 weight percent $SiO_2$ on an anhydrous basis) or silicates, e.g., contain $SiO_2$ and one or more metal oxides.

Most of these siliceous paper pigments usually are below 200 square meters per gram in surface area. The best silicas and silicates such as calcium silicate normally have surface areas of 10 to 75 square meters per gram. Such surface areas refer to those measured in accordance with the Brunauer-Emmett-Teller method which is described in the Journal of the Americal Chemical Society, volume 60, page 309 (1938).

Two types of water are present in the pigments, "bound water" and "free water." The term "free water," as herein employed, denotes water which may be removed from the pigment by heating to a temperature of 105° C. for a period of 24 hours in a laboratory oven. "Bound water," as used herein, is intended to mean the amount of water which is given off from the pigment by heating at ignition temperatures, for example, 1000° C. to 1200° C., until no further water can be removed, minus the amount of "free water" in the pigment. Thus, these pigments are referred to as hydrated in that they contain some water, either as "bound water" and "free water." Bound water and free water usually each constitute 2 to 10 percent by weight of the composition.

One of the siliceous pigments is finely divided, precipitated, hydrated, porous, flocculated, amorphous silica composition having an average ultimate particle size of about 0.1 micron or less, usually in the range of 0.035 to 0.08 micron, and having at least 55 percent by its weight below 7 microns in floc size. The best silicas generally have surface areas, as precipitated, of 10 to 75 square meters per gram.

The amount of bound water in the silica may vary. Typical silicas have a chemical composition basis their $SiO_2$ and bound water content represented by the formula:

$$H_2O \cdot (SiO_2)_x$$

wherein $x$ is a whole or fractional number from 3 to 85 and $H_2O$ represents bound water.

Usually, free water constitutes from 2 to 10 percent by weight of the silica in the pigment.

"Silica," as used herein, refers to a pigment containing at least 90 percent $SiO_2$ by weight on an anhydrous basis.

Comprising the balance of the pigment, when the $SiO_2$ content is less than 100 percent, e.g., say 94 percent $SiO_2$ by weight on an anhydrous basis, are minor quantities of other oxides. One such oxide is often calcium oxide, present usually in concentrations ranging normally between 0.5 to 6 weight percent. Other constituents present mainly in minor concentrations of 0.1 to 2 percent by weight on an anhydrous basis include iron and aluminum oxides, sodium chloride and carbon dioxide.

These silicas also often contain small quantities of sodium oxide. When present, the sodium content measured as $Na_2O$ is well below 1.75 percent by weight. The silica also may include minor quantities of other metals such as alkaline earth metals, such as magnesium, barium and zinc. These metals are present probably as a metal oxide, possibly in chemical association with the silicas.

Suitable paper pigments also include finely divided, flocculated, inorganic metal silicates having flocs and ultimate particles of the desired size. Whether these metal silicas are chemically combined mixtures of the metal oxide (or metal oxides) and $SiO_2$ is not altogether clear. Nevertheless, these siliceous compositions analytically conform (on an $SiO_2$ and metal oxide or oxides basis) to the equation:

$$MO \cdot (SiO_2)_x$$

wherein M represents one or more metal cations such as one or more of the following: calcium, magnesium, barium, strontium, aluminum and the like, and $x$ may be a value of 1 to 150, and more usually a value of 2 to 50. Useful metal silicate pigments include precipitated calcium silicates, aluminum silicates (alumina-silica pigments), and calcium sodium aluminum silicate, among others.

Depending upon the particular siliceous paper pigment, different methods for their production are often employed. The examples are illustrative of the methods which are effective for providing the appropriate siliceous paper pigments.

EXAMPLE I

Seventeen thousand gallons of sodium silicate containing a maximum of 0.08 percent NaCl by weight, $Na_2O(SiO_2)_{3.36}$, diluted to a concentration of 40.6 grams $Na_2O$ per liter, was heated with direct steam to 75° C., and charged into a tank 26 feet tall and 18 feet in diameter to establish a liquid depth of 8 feet. Gas containing about 10.5 percent by weight carbon dioxide and the balance mainly nitrogen was bubbled into the silicate solution through a 6 foot diameter dispersion ring concentrically disposed in the tank 4 feet above the tank's bottom and downwardly facing, one-inch diameter holes spaced one foot part. Agitation was supplied by rotating a 45 revolutions per minute arc-blade turbo agitator with a 6 foot diameter blade located approximately 2 feet below the liquid level in the tank.

The gas was fed at the rate of about 1400 cubic feet per minute (standard conditions, 760 millimeters mercury pressure at 0° C.) for the first 3 hours of carbonation, after which the rate was reduced to about 1300 cubic feet per minute at standard conditions for an additional 13 hours. After about 2 hours and 26 minutes, silica precipitation occurred, and after 6 and ½ hours of carbonation, 100 percent carbonation was reached as determined by the double end point method of titration for soda ash-bicarbonate solution. The final degree of carbonation was 141 percent.

At the end of carbonation, live steam was introduced into the bottom of the slurry at a rate such that the boiling point was reached in about 30 minutes and this boiling was continued for 90 minutes. Sufficient Arquad 2C, a commercial dialkyl dimethyl ammonium chloride, was then added to establish 0.3 percent by weight concentration thereof, on a dry solids basis.

This slurry was washed in a three Dorr tank system, a continuous countercurrent decantation system. Slurry was pumped to this system at the rate of 3 gallons per minute and about 90 percent of the alkali was removed in the first two Dorr tanks with a counterflow of about 15 gallons per minute of condensate at about 93° C. Continuously removed from this system, the slurry was acidified batch-wise with hydrochloric acid to about 4.5 pH. This acidified slurry was returned to a third Dorr tank to remove residual sodium chloride to a concentration of less than 1.0 grams per liter.

The underflow removed from the system contained some 12 to 20 percent solid in the first alkaline wash, from 10 to 16 percent in the second alkaline wash, and from 15 to 18 percent in the hydrochloric acid wash. After washing, the pigment was filtered on a continuous rotary vacuum filter wheel at filtration rates of from 10 pounds per hour per square foot to 50 pounds per hour per square foot. After such filtration, the cake was dried in a steam tube-heated rotary dryer using 125 pounds per square inch gauge steam. After drying to 2 to 5 percent by weight free moisture, the material was milled in an 18 inch Raymond vertical mill.

Silica prepared in this manner had a surface area of 41 square meters per gram, an ultimate particle size diameter as determined under the electron microscope of from 0.09 to 0.11 micron (about 0.1 micron) and 69 percent by weight of flocs of a diameter less than 7 microns, as determined by the afterdescribed sedimentation test. The predominant weight proportion of the flocs sized less than 7 microns was in the range of 0.5 to 7 microns.

Following the above general procedure, but varying the concentration of sodium silicate, the rate of carbonation and temperature makes it possible to obtain finely divided flocculated silica of the desired quality having surface areas ranging usually from about 15 to 90 square meters per gram, an average ultimate particle size ranging as low as 0.025 micron and at least 60 percent by its weight as the flocs below 7 microns in size.

The effectivenss of pigmenting paper with silica produced according to Example I is shown in these examples:

EXAMPLE II

A pulp beater was charged with 360 grams of bleached kraft pulp dispersed in 23 liters of water and beaten in a Niagara beater for about 70 minutes to approximately 400 milliliters freeness (Canadian standard). A 21.1 kilogram portion of this beaten pulp was transferred to a rubberized drum and further mixed with an Eastern mixer.

To 18.1 kilograms of this pulp, a 400 cubic centimeter aqueous slurry containing 28 grams of silica prepared in accordance with Example I and having a surface area of 41 square meters per gram, a bulk density of 0.32 gram per cubic centimeter at 3 pounds per square inch gauge and an average ultimate particle size under the electron microscope of 0.09 to 0.11 micron was then mixed with the above pulp slurry for 5 minutes. Sixty-nine percent by weight of the flocs of this pigment were below 7 microns in diameter, and the preponderant weight proportion of these flocs were between 0.5 to 7 microns in size. Sufficient aluminum sulfate octadecahydrate was added to establish the white water pH at 5.0 and the chest at pH 4.8.

Thereafter, this pulp slurry was sheeted on a laboratory Noble-Wood sheet machine. Paper so produced had an opacity of 81.4 (the ratio of brightness of a single sheet with a black backing to the brightness of the same sheet with a white backing), a brightness of 82.7 percent Hunter, a tear factor of 41 grams per gram sheet and a burst factor of 9.2 pounds per square inch per one gram sheet. The paper had an ash of 8.1 percent indicating excellent pigment retention. Paper of this opacity, brightness, and tear and burst factor possesses an excellent combination of desirable qualities.

EXAMPLE III

Paper was produced according to the procedure of Example II, employing a silica prepared by the procedure of Example I and having a surface area of 32 square meters per gram and a bulk density of 0.46 gram per cubic centimeter at 3 pounds per square inch gauge. The weight percent of flocs below 7 microns in diameter for this silica pigment was 63.9. In this experiment, sufficient aluminum sulfate octadecahydrate by weight of the pulp on a dry basis was added at each point and the chest water pH was 5.2, while the white water pH was 5.3. This paper had an opacity of 81.4, a brightness of 84.3 percent Hunter, a tear factor of 41 grams per gram sheet, and a burst factor of 9.4 pounds per square inch per one gram sheet. It had an ash of 8.5 percent by weight, demonstrating excellent pigment retention. Again, the above data indicates the preparation of excellent quality paper.

EXAMPLE IV

In this example, silica prepared as in Example I was employed except that it was acid treated prior to heat conditioning. Thus, the silica had a surface area of over 124 square meters per gram, although upon precipitation in an alkaline slurry, its surface area was 28 square meters per gram. The silica had a bulk density of 0.38 gram per cubic centimeter at 3 pounds per square inch gauge, an ultimate particle size of 0.09 micron in diameter under the electron microscope and 55.9 percent by weight of its flocs were less than 7 microns in diameter.

Paper pigmented with this silica by the procedure of Example II had an ash of 7.8 weight percent, an opacity of 80.0, a brightness of 82.5 percent Hunter, a tear factor of 44 grams per gram sheet and a burst factor of 9.0 pounds per square inch per one gram sheet.

EXAMPLE V

Using a 72 liter $Na_2O(SiO_2)_{3.2}$ solution containing 20.3 grams $Na_2O$ per liter and 2.5 grams sodium chloride per liter, carbonating with $CO_2$ for 4 hours at 85° C., and washing and acidifying provided the silica pigment. Thereafter, it was micropulverized. This micropulverized pigment had 60 weight percent of its flocs less than 7 microns in diameter, a surface area of 49 square meters per gram, a bulk density of 0.192 gram per cubic centimeter and an average ultimate particle size of 0.045 micron.

EXAMPLE VI

Using a 72 liter batch, and carbonating with 100 percent pure carbon dioxide for 4 hours (equivalent to 150 percent theoretical carbonation), at 85° C., the pigment was prepared from a sodium silicate solution of $Na_2O(SiO_2)_{3.38}$ containing 20.3 grams $Na_2O$ per liter and 10 grams sodium chloride per liter. Thereafter, it was micronized. This silica pigment had a surface area of 30 square meters per gram and 98 percent by its weight as flocs less than 7 microns in diameter.

EXAMPLE VII

The above pigments were then used to pigment paper according to the paper making operation as described in Example II above, and the paper produced thereby tested for the significant paper qualities with the following results:

| Pigment | Paper Properties | | | | |
|---|---|---|---|---|---|
| | Ash, Weight Percent | Opacity | Brightness | Tear [1] | Burst [2] |
| Example V | 8.4 | 81.3 | 83.2 | 37 | 8.2 |
| Example VI | 8.4 | 83.5 | 81.4 | 39 | 8.7 |

[1] Grams per one gram sheet (8 inch by 8 inch square).
[2] Pounds per square inch per one gram sheet.

This example illustrates a typical method of preparing an effective calcium silicate or like alkaline earth metal silicate paper pigment:

EXAMPLE VIII

The precipitation of finely divided, low surface area calcium silicate was conducted in a 100 gallon rubber-lined tank fitted with a one-half inch feed line in the form of a horizontal distributor across the top of the tank for multiple stream addition of sodium silicate solution. A product removal line 2 inches in diameter was disposed within the tank at a point representing the 60 gallon level thereof, and provided with an external leg to control the liquid contents of the tank at between 60 to 85 gallons. Calcium chloride solution was introduced via a one-half inch line into the bottom of the tank. Air was passed into the bottom of the reactor, imparting a gentle rolling agitation to the slurry.

Aqueous solutions of the respective reagents containing 100 grams per liter of calcium chloride and 100 grams per liter of $SiO_2$ were fed to the reactor through their respective feed lines at average feed rates of 2.95 gallons per minute of silicate solution and 1.98 gallons per minute of calcium chloride solution. This maintained an excess calcium chloride level of approximately 15 to 20 percent. In this manner, slurry was precipitated at the rate of about 5 gallons per minute and contained approximately 7.5 percent solids by weight.

The precipitated slurry was withdrawn at a rate corresponding to the rate of its formation and pumped directly to a storage tank and thereafter washed in a three Dorr tank system using an 8 to 3 water-slurry ratio. At a feed rate of 3 gallons of slurry per minute, the final wash slurry contained about 8 percent solids by weight. This washed slurry was filtered on an Oliver wheel and the resulting filter cake containing an average of 23.6 percent solids by weight was dried in a Louisville dryer. After drying, the pigment was milled in a vertical mill arrangement to provide a product containing less than 0.1 percent residue on a 325 mesh screen.

Calcium silicate produced and recovered in the above manner had a surface area ranging between 32 and 36 square meters per gram, a pH of 10.5 in aqueous slurry and contained about 0.47 percent NaCl by weight. As precipitated and removed from the reactor, the surface area was about 44 square meters per gram, the aging apparently being responsible for a surface area decrease of 8 to 10 square meters per gram. Bound water in the concentration of about 10 percent by weight of the pigment and free water in the range of 3.3 to 5.3 percent were present. The calcium silicate had a composition conforming to the formula $CaO(SiO_2)_{3.1-4.75}$. An average composition for the product was $CaO(SiO_2)_{3.33}$.

By following the above procedure but varying the amount of excess calcium chloride employed, calcium silicate pigments having final surface areas other than 32 to 36 square meters per gram but in the range of 10 to 50 square meters per gram were prepared. Thus, using calcium chloride in proportion of from 0 to 1 or 2 percent stoichiometric excess provided calcium silicate having a surface area in the range of 10 to 16 square meters per gram. With calcium chloride excesses of from about 4 to 10 percent, calcium silicate pigments resulted having surface areas in the general range of from 20 to 40 square meters per gram. Excess calcium chloride concentrations ranging from about 15 to 20 percent gave pigments having surface areas ranging between 35 and about 50 square meters per gram.

Following the drying, the calcium silicate (or like alkaline earth metal silicate, such as magnesium silicate or strontium silicate) is ground and air classified to separate a coarse fraction and produce an alkaline earth metal silicate in which at least 55 percent, and preferably 70 to 95 percent by weight of the flocs are below 7 microns, the preponderant weight thereof being 0.5 to 7 microns in size, the ultimate particle size being in the range of about 0.05 to 0.08 micron.

EXAMPLE IX

A calcium silicate composition prepared according to Example VIII having a surface area of about 30 square meters per gram and an average ultimate particle size of 0.04 to 0.08 was air classified to produce a fraction in which 86 percent by weight of the flocs were below 7 microns and a fraction in which but 39 percent by weight of the flocs were below 7 microns. The fractions were then used to prepare paper according to the procedure of Example II with these results:

| Weight Percent Flocs Less Than 7 Microns | Paper Properties | | |
|---|---|---|---|
| | Ash, Weight Percent | Opacity | Brightness |
| 39 | 6.2 | 77.2 | 77.3 |
| 86 | 6.5 | 81.6 | 79.8 |

Calcium silicate as precipitated in Example VIII may be reacted with an aluminum salt such as aluminum sulfate and the resulting pigment dried and classified, if necessary to achieve a product having proper floc size. Alternatively, appropriately flocculated calcium silicate may be reacted with aluminum sulfate or the like in a pulp suspension to provide an alumina-silica pigment as shown in Example X.

EXAMPLE X

The pulp beater is charged with 360 grams of bleached kraft pulp, dispersed in 23 liters of water and beaten in a Niagara beater for about 70 minutes to approximately 400 milliliters' freeness (Canadian standard). A 21.1 kilogram portion of this beaten pulp is transferred to a rubberized drum and further mixed with an Eastern mixer. To 18.1 kilograms of this mixed pulp, 400 cubic centimeters of aqueous aluminum sulfate solution containing 19.6 grams of $Al_2(SO_4)_3 \cdot 18H_2O$ (7.0 percent by weight of the pulp) is added and mixed therewith for 5 minutes.

A 400 cubic centimeter aqueous slurry containing 28 grams of calcium silicate having a surface area of 31 square meters per gram and prepared as described in Example VIII, an average ultimate particle size from 0.04 to 0.08 micron and a packed bulk density of 0.377 gram per milliliter at 3 pounds per square inch gauge is then mixed with the above pulp slurry for an additional 5 minutes. Prior to use, this pigment was air classified to remove coarse particles and to provide a product in which the aggregates were preponderantly in the range of 1 to 7 microns. A small additional quantity of $Al_2(SO_4)_3 \cdot 18H_2O$ (0.7 percent by weight of the pulp on a dry basis) was added to adjust the slurry and white water to pH 5. This provided a slurry containing 10 percent calcium silicate and 7.7 percent $Al_2(SO_4)_3 \cdot 18H_2O$ based on the dry weight of the pulp. This pulp slurry is then sheeted on a laboratory Noble-Wood sheeting machine.

Paper produced in accordance with the above procedure and having an alumina-silica pigment dispersed therein had an opacity of 80.6 (the ratio of brightness of a single sheet with a black backing to the brightness of the same sheet with a white backing), a brightness of 81.2, a tear factor of 36 grams per gram of sheet and a burst factor of 10.1 pounds per square inch per gram of sheet. Such paper had an ash of 7.2 percent by weight indicating good pigment retention. Paper having high opacity and brightness of this character is of high quality. The tear and burst factors indicate commendable strength for pigmented paper.

Such aluminum silicates are finely divided, soft, pulverulent, amorphous, flocculated products of the composition $Al_2O_3 \cdot (SiO_2)_y$ where $y$ is 6 to about 100, including fraction numbers. Their ultimate particle size is below about 0.2 micron, often below 0.1 micron and above about 0.05 micron. The silicates may contain substantial amounts of metals other than aluminum. Thus, a pigment having the following composition is illustrative:

| | Weight percent |
|---|---|
| Ignition loss at 1000° C. | 16.7 |
| Loss on drying at 105° C. | 5.4 |
| $SiO_2$ | 46.1 |
| $R_2O_3$ (almost entirely $Al_2O_3$) | 10.88 |
| $Fe_2O_3$ | 0.24 |
| CaO | 11.82 |
| MgO | 0.38 |
| $Na_2O$ | 10.04 |
| Chloride | 0.04 |
| $SO_3$ | 3.8 |
| $CO_2$ | 6.6 |

As shown above, the alumina-silica products may be, and frequently are, mixed with other salts such as calcium sulfate and the like. Quite often, they also contain other metals such as calcium, zinc, barium, and the like, the presence of which are advantageous in order to maintain the basicity of the pigment. They are invariably amorphous.

The products normally contain 2 to 10 percent by weight of free water (water which can be driven off by heating at 105° C. for 24 hours) and 2 to 10 percent by weight of bound water.

It is also possible, by the method of precipitation, to produce alumina-silica pigments having their flocs predominantly less than 7 microns. Thus, by recourse to specific techniques an aluminum salt such as aluminum sulfate may be reacted with finely divided calcium silicate to produce utilimately an alumina-silica composition so flocculated. One such method entails partially reacting a slurry of calcium silicate with aluminum sulfate and recovering the product. This product may be thereafter further reacted with aluminum salt, preferably in a pulp slurry. As illustrated by the immediately ensuing examples, proper performance of such method provides a flocculated alumina-silica pigment of appropriate floc size.

EXAMPLE XI

An aqueous slurry of calcium silicate produced by a method in which solutions of sodium silicate and calcium chloride were mixed under conditions of violent agitation provided by the centrifugal action of the pump was divided up into batches containing 400 grams of calcium silicate (basis calcium silicate dried at 105° C.). The slurry containing 5.4 weight percent calcium silicate (basis dry weight), 48 grams per liter of sodium chloride and 34 grams per liter of calcium chloride. Calcium silicate so prepared contained 3.25 moles of $SiO_2$ per mole of CaO and had a surface area of 96 square meters per gram. When recovered from the slurry and dried, the calcium silicate was a white, finely divided, precipitated, amorphous material having an ultimate particle size of less than 1.0 micron and more particularly from 0.01 to 0.05, averaging 0.03 micron, so flocculated that the flocs were considerably larger than 7 microns, e.g., 30 to 60 microns. Such calcium silicate has a typical composition:

| | Weight percent |
|---|---|
| $SiO_2$ | 65.58 |
| $R_2O_3$ | 0.59 |
| $Fe_2O_3$ | 0.17 |
| CaO | 18.80 |
| MgO | 0.18 |
| NaCl | 0.81 |
| Ignition loss at 1000° C. | 12.88 |

A 400 gram sample of this calcium silicate requires (determined by experimentation) approximately 640 milliliters of an aqueous solution of alum containing 500 grams per liter of alum as $Al_2(SO_4)_3 \cdot 18H_2O$ for complete neutralization (extract essentially all of the calcium oxide).

Different quantities of an aqueous alum solution (containing 500 grams per liter of $Al_2(SO_4)_3 \cdot 18H_2O$) were added to individual batches of the calcium silicate slurry at about 25° C. according to the data tabulated in the following table:

| Batch | Volume of Alum Solution Added (milliliters) | Amount of Added Alum Equivalent to Percent Neutralization | pH of Slurry | B.E.T.[1] m.²/gm. |
|---|---|---|---|---|
| A (Control) | 0 | 0 | | |
| B | 64 | 9.9 | 8.5 | 123 |
| C | 224 | 34.7 | 8.3 | 169 |
| D | 320 | 49.5 | 8.2 | 180 |
| E | 416 | 64.3 | 7.7 | 239 |
| F | 576 | 89.0 | 6.2 | 127 |
| G | 640 | 99.0 | 4.7 | 130 |

[1] Surface area, square meters per gram, as measured by the Brunauer-Emmett-Teller method.

Slurries of alumina-silica compositions so produced were filtered, washed, oven dried at 105° C. and micropulverized. Samples of batches D and E had a composition of:

| | Analysis sample, Batch D (Weight Percent) | Analysis sample, Batch E (Weight Percent) |
|---|---|---|
| $SiO_2$ | 54.7 | 52.8 |
| $R_2O_3$ | 6.8 | 8.0 |
| $Fe_2O_3$ | 0.08 | 0.08 |
| $CaO$ | 13.85 | 12.94 |
| $SO_3$ | 8.81 | 11.36 |
| $Na$ | <0.01 | <0.01 |
| $Cl$ | <0.01 | <0.01 |
| Loss on Drying at 105° C | 8.6 | 8.5 |
| Ignition Loss at 1,000° C | 16.5 | 15.4 |
| pH | 8.6 | 8.3 |

The pH referes to the pH of the slurry produced by reslurrying in water the washed, dried composition. Weight percent loss at 105° C. is the free water in the pigment as measured by loss in weight due to removal of water by drying at 105° C. for 24 hours. Weight percent loss on ignition represents the amount of water lost while heating the pigment at 1000° C. Ignition loss measures the bound water and free water found in the pigment, bound water being the difference between the ignition loss and loss of weight by heating at 105° C. Apparently, the bound water is chemically combined in the pigment and not readily removed except by rather severe heat treatment.

Samples of the alumina-silica pigments produced (batches A through G inclusive) were studied under an optical microscope and by use of photomicrographs. Sample A (the control) was comprised mainly of large aggregates measuring from 30 to 60 microns in diameter. Photomicrographs of sample B indicated it contained fewer aggregates measuring from 30 to 60 microns in diameter than sample A. The number of aggregates in the 30 to 60 micron diameter range decreases in pigments prepared with greater amounts of alum. Thus, sample C was comprised of considerably less of such large aggregates than sample B.

This decrease in large aggregates as the increased degree of neutralization increased was observed with those products prepared using less than 50 percent of the alum required for complete neutralization. Products prepared using from about 40 or 50 percent and 65 percent of the alum required for complete neutralization were practically free of aggregates. Photomicrographs of samples D and E indicated practical absence of 30 to 60 micron flocs as well as any flocs of discernible size.

Alumina-silica (or aluminum silicates) prepared with more than about 65 percent of alum required for full neutralization were comprised of increasing amounts of aggregates considerably larger than 7 microns.

However, by partially reacting or neutralizing calcium silicate (to the extent of 30 to 70 percent of complete neutralization) with aluminum sulfate or like aluminum salt in a calcium silicate slurry such as is provided by reaction of sodium silicate and calcium chloride, a pigmentary calcium silicate-alumina-silica composition is obtained which upon recovery, drying and mechanical pulverizing is admirably suited for enhancing the optical properties (opacity and brightness) of paper. Paper of enhanced optical properties is provided by including the partially neutralized calcium silicate composition in the pulp slurry along with aluminum sulfate and sheeting the slurry into paper. Reaction between the composition and aluminum sulfate occurs with the result that an alumina-silica (aluminum silicate) composition comprised in the main of flocs sized between 0.5 and 7 microns is dispersed in the sheet. Optical properties of such paper are superior to those of papers prepared by including unneutralized calcium silicate and alum in pulp slurries prior to sheeting.

The following example illustrates the use of silicates (provided by neutralizing 30 to 70 percent of a calcium silicate with an aluminum salt) comprised of flocs in the main sized from 0.5 to 7 microns for improving the optical properties of paper.

EXAMPLE XII

A pulp beater was charged with 500 grams of bleached kraft paper dispersed in 23 liters of water and beaten in a Niagara beater for about 95 minutes to approximately 400 millimeters freeness (Canadian standard). A 7.0 kilogram portion of this beaten pulp was transferred to a rubberized drum and further mixed with an Eastern mixer.

A 300 cubic centimeter portion of an aqueous slurry containing 14 grams of a pigment produced by the process described in Example XI above was then mixed with the above plup slurry for an additional 5 minutes. Sufficient $Al_2(SO_4)_3 \cdot 18H_2O$ was added to the slurry to adjust the slurry in white water to about pH 5. Depending on the particular pigment and its degree of neutralization, according to the process described in Example XI, this quantity varied but was sufficient to further neutralize the pigment.

Thus, a slurry containing 10 percent of the sample of calcium-aluminum silicate basis the dry weight of the pulp was provided. This pulp slurry was then sheeted on a laboratory Noble-Wood sheeting machine.

A series of runs were performed in this fashion with the different pigments and the properties of the sheets so prepared obtained as follows:

| Pigment sample | Percent Calcium silicate Neutralized | Paper Properties | | | | |
|---|---|---|---|---|---|---|
| | | Ash, Weight Percent | Opacity | Brightness | Tear [1] | Burst [2] |
| A | 0 | 6.0 | 74.3 | 77.4 | 33 | 10.2 |
| B | 9.9 | 6.2 | 72.9 | 74.9 | 31 | 11.1 |
| C | 34.7 | 5.8 | 78.2 | 80.1 | 33 | 10.0 |
| D | 49.5 | 5.7 | 79.8 | 80.1 | 39 | 9.0 |
| E | 64.3 | 4.6 | 77.2 | 79.5 | 35 | 9.7 |
| F | 89.0 | 2.7 | 73.5 | 77.7 | 34 | 10.9 |
| G | 99.0 | 4.8 | 75.3 | 79.7 | 34 | 10.2 |

[1] Tear factor—grams per gram of sheet 8 inches by 8 inches.
[2] Burst factor—pounds per square inch per gram of sheet 8 inches by 8 inches.

Analysis of the pigment content of the sheeted paper as prepared above indicates reaction between the composition and the aluminum sulfate in the slurry.

The foregoing data demonstrates the marked enhancement in optical properties (opacity and brightness) of paper prepared using alumina-calcium silicate pigments resulting from proper partial neutralization of calcium silicate with aluminum sulfate. Thus, the opacity of papers prepared from calcium silicate pigments partially neutralized to such an extent ranges from 77 to 80, whereas with but a 10 percent aluminum sulfate neutralized pigment, the opacity is but about 73 percent and, with 90 percent neutralization, the opacity is but 73.5. Siliceous materials neutralized with amounts of aluminum sulfate other than 30 to 70 percent of theoretical are not flocculated such that at least 55 percent by weight of their flocs are less than 7 microns. Calcium silicate may be partially reacted with other water-soluble aluminum salts to provide pigments having the predominant weight proportion of their flocs less than 7 microns as shown by Example XIII.

num sulfate in a pulp slurry and paper sheeted with the resulting slurry according to the procedure of Example II with these results:

| Pigment Sample | Slurry, pH | Percent Calcium Silicate Neutralized | BET, Square Meters Per Gram | Paper Properties ||||
|---|---|---|---|---|---|---|---|
| | | | | Ash, Weight percent | Opacity | Brightness | Tear | Burst |
| 1 | 8.2 | 25 | 89 | 6.8 | 81.3 | 81.1 | 44 | 7.3 |
| 2 | 8.0 | 40 | 130 | 6.8 | 83.8 | 80.2 | 39 | 8.4 |
| 3 | 7.9 | 50 | 174 | 7.0 | 83.1 | 79.7 | 37 | 7.6 |
| 4 | 7.1 | 60 | 218 | 5.8 | 81.6 | 80.0 | 41 | 8.7 |

Pigment samples 1 to 4 were flocculated, finely divided products having over 55 weight percent of their flocs below 7 microns.

Alumina-silica pigments having at least 55 weight percent of their flocs less than 7 microns are also prepared by simultaneously mixing with intense agitation an aluminum salt such as aluminum chloride, calcium chloride or like alkaline earth metal salt and an alkali metal silicate, e.g., sodium silicate. This intense agitation is provided, for example, by feeding the respective reactants to a centrifugal pump and accomplishing the mixing by the agitation developed in the pump chamber as illustrated by the following examples:

EXAMPLE XIII

An aqueous slurry of calcium silicate was prepared by reacting with gentle agitation aqueous solutions of sodium silicate and calcium chloride. This slurry contained 8.72 weight percent of calcium silicate (dry weight basis of calcium silicate), 4.02 grams per liter of calcium chloride, 54.63 grams per liter of sodium chloride, and was essentially free of sodium silicate. The calcium silicate had the following analysis:

| | |
|---|---|
| $SiO_2$ | weight percent __ 64.4 |
| $R_2O_3$ | do ____ 1.05 |
| CaO | do ____ 17.5 |
| Na | do ____ 1.08 |
| Cl | do ____ .02 |
| Loss on drying at 105° C. | do ____ 6.89 |
| Ignition loss at 1000° C. | do ____ 15.9 |
| Surface area | square meters per gram __ 44 |

A plurality of equal batches of this slurry were provided, each containing 800 grams of dry solids. Each batch was stirred in a bucket and an amount of aluminum chloride (as $AlCl_3 \cdot 6H_2O$) in aqueous solution sufficient to provide the indicated degree of partial neutralization was added. After 5 minutes of stirring, the pH was obtained, and half the slurry was filtered, the filter cake washed with water, dried in an oven at 105° C. and milled by passage through a micropulverizer.

A plurality of pigments were then reacted with alumi-

EXAMPLE XIV

A stream of an aqueous solution of sodium silicate containing 50 grams per liter of $Na_2O(SiO_2)_{3.36}$ and a stream of an aqueous solution containing 50 grams per liter of a mixture of calcium chloride and aluminum chloride (the mole ratio of calcium chloride to aluminum chloride being 1 to 1) were introduced into a centrifugal pump as described above, proportioning the streams so that the metal chlorides were 10 percent in excess of stoichiometric. The slurry was filtered on a Büchner funnel and the filter cake dried at about 100° C. and pulverized. The resulting product contained 68.64 percent $SiO_2$, 7.31 percent $Al_2O_3$, and 8.01 percent CaO.

EXAMPLE XV

Pigmentary, flocculated calcium aluminum silicates were precipitated by feeding an aqueous stream of $Na_2O(SiO_2)_{3.28}$ containing 40 grams per liter of $Na_2O$ and an aqueous stream containing 100 grams per liter of calcium chloride and varying concentrations of aluminum chloride to a centrifugal pump while proportioning the relative solution feed rates and relative concentrations of aluminum chloride and calcium chloride in accordance with the conditions listed in Table I below.

*Table I*

| Run No. | Grams per Liter in Chloride Stream || $AlCl_3$ Equivalent to Percent of Stoichiometric | Temp., °C. | Percent Stoichiometric Excess of $CaCl_2$ | Surface Area, m²/g. |
|---|---|---|---|---|---|---|
| | $AlCl_3$ | $AlCl_3 \cdot 6H_2O$ | | | | |
| 1 | 53 | | 95 | 25 | 135 | 191 |
| 2 | 40 | | 70 | 25 | 110 | 348 |
| 3 | 20 | | 43 | 25 | 83 | 161 |
| 4 | 12.5 | | 22 | 25 | 62 | 115 |
| 5 | 28.8 | | 47 | 5 | 82 | 127 |
| 6 | 43 | | 75 | 5 | 115 | 421 |
| 7 | 34.5 | | 50 | 5 | 65 | 133 |
| 8 | 19.3 | | 27 | 5 | 25 | 99 |
| 9 | 28.7 | | 39 | 50 | 47 | 124 |
| 10 | 28.7 | | 48 | 75 | 85 | 176 |
| 11 | | 52 | 52 | 90 | 92 | 200 |
| 12 | | 53 | 54 | 2 | 95 | 185 |
| 13 | | 53 | 50 | 2 | 95 | 191 |
| 14(A) | | 53 | 45 | 2 | 85 | 103 |
| 15(B) | 28.7 | | 48 | 75 | 85 | 132 |

(A) Pigment precipitated while recirculating slurry to pump.
(B) Slurry boiled for one hour.

The respective slurries produced according to the above conditions were filtered and the filter cake washed three times with distilled water. Thereafter, the filter cakes were dried at 110° C. for 6 to 12 hours and micropulverized.

Pigment samples from different batches were analyzed for their chemical composition as follows:

| Pigment Sample from Run No. | Percent by Weight | | | | | |
|---|---|---|---|---|---|---|
| | Ignition Loss (Bound and Free Water) | SiO$_2$ | Al$_2$O$_3$ | CaO | Na | Cl |
| 3 | 16.8 | 65.4 | 6.67 | 9.48 | 0.53 | 0.02 |
| 5 | 18.7 | 62.4 | 5.76 | 9.85 | 1.80 | 2.49 |
| 7 | 17.7 | 64.5 | 6.61 | 8.99 | 1.13 | 1.25 |
| 10 | 17.8 | 64.0 | 6.79 | 10.17 | 0.70 | 0.11 |

EXAMPLE XVI

Calcium aluminum silicates prepared according to Example XV were used to pigment paper. This was done by charging to a Niagara beater 500 grams of bleached kraft pulp dispersed in 23 liters of water and beating for about 95 minutes to approximately 400 milliliters freeness (Canadian standard). A 7.0 kilogram portion of this beaten pulp was transferred to a rubberized drum and further mixed with an Eastern mixer.

A 300 cubic centimeter portion of an aqueous slurry containing 14 grams of a calcium aluminum silicate slurry produced as described in Example XV was mixed with the prepared pulp slurry for 5 minutes. Sufficient $$Al_2(SO_4)_3 \cdot 18H_2O$$

was added to adjust the slurry and white water to about pH 5.

This pulp slurry was sheeted on a laboratory Noble-Wood sheeting machine and representative sheets of the respective runs were tested to evaluate their brightness, opacity, tear, burst factor and ash contents with these results:

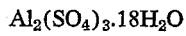

| Pigment Sample No. | Paper Properties | | | | |
|---|---|---|---|---|---|
| | Ash, Weight Percent | Opacity | Brightness | Tear | Burst |
| 3 | 6.8 | 81.6 | 81.0 | 34 | 8.4 |
| 5 | 6.5 | 82.8 | 81.0 | 42 | 7.5 |
| 7 | 6.6 | 83.2 | 81.9 | 37 | 7.1 |
| 10 | 6.2 | 80.0 | 80.2 | 40 | 7.3 |
| 15 | 7.4 | 80.8 | 80.8 | 36 | 7.4 |
| 12 | 5.0 | 80.2 | 80.1 | 34 | 9.6 |
| 13 | 5.2 | 80.5 | 81.2 | 33 | 9.1 |
| 14 | 6.6 | 82.2 | 81.1 | 39 | 8.2 |

The above data demonstrate the highly effective contribution to optical properties of paper provided by use of flocculated, finely divided calcium aluminum silicates having in excess of 55 percent by weight of its flocs below 7 microns.

These siliceous pigments are also used with extreme effectiveness in combination with paper grade titanium dioxide for pigmentation of paper. Especially unexpected enhancement of opacity, for example, is realized using mixtures containing between 35 and 95 percent titanium dioxide by weight of the titanium dioxide and siliceous pigment as shown by the following data obtained by forming paper as in Example II, using mixtures of titanium dioxide and a properly flocculated calcium silicate.

| Percent Pigment | | Paper Properties | | |
|---|---|---|---|---|
| Silicate | TiO$_2$ | Ash, Weight Percent | Opacity | Brightness |
| 0 | 10 | 6.57 | 86.4 | 85.9 |
| 2 | 8 | 8.31 | 88.5 | 86.7 |
| 4 | 6 | 7.95 | 88.1 | 86.7 |
| 6 | 4 | 7.50 | 86.9 | 85.7 |
| 8 | 2 | 6.85 | 84.6 | 84.7 |
| 10 | 0 | 6.66 | 81.4 | 82.2 |

The floc sizes herein mentioned are determined by a specific procedure, which although not necessarily providing an absolute measurement, does establish a scientifically significant, readily determinable standard. The procedure involves warming an aqueous pyrophosphate solution containing 0.05 percent pyrophosphate by weight to 30° C. in a water bath. This solution is prepared by neutralizing distilled water to a pH of 7 with sodium hydroxide and dissolving 0.84 gram of tetrasodium pyrophosphate decahydrate in each liter of neutral water. To approximately 250 cubic centimeters of this heated solution is added 2.50 grams of silica and the resulting mixture is treated in a Waring Blendor for exactly 15 seconds, whereafter the slurry is transferred to a 250 milliliter graduated, stoppered cylinder and mixed thoroughly by inverting the cylinder. The level is adjusted to the 250 milliliter mark before mixing.

After mixing, the cylinder is placed in the upright position and a timer started. Immediately, a 5 milliliter pipette so fitted with a rubber stopper that it will reach exactly 2.2 centimeters below the 245 milliliter mark of the cylinder is inserted and a 5 milliliter slurry sample is withdrawn into a tared weighing bottle. After 49 minutes, a second sample is withdrawn into a tared weighing bottle and the respective samples are dried at 105° C. in an oven overnight.

The ratio times one hundred of the weight of the second sample divided by the weight of the first sample is the percent of flocs less than 7 microns in diameter.

These exemplary siliceous paper pigments are useful for preparing paper by procedures which include incorporating the pigment in the paper pulp slurry and thereafter forming the pulp into paper by recognized sheeting techniques. Thus, the desirable siliceous pigment may be simply added to a pulp slurry and well dispersed therein prior to sheeting in the conventional manner the slurry.

In one well suited procedure, the siliceous pigment is added to the pulp slurry after it has been formed or after most of the beating is accomplished. This avoids subjecting the pigment to unnecessary agitation or beating and minimizes the opportunity for disrupting the desired flocculated condition of the pigment. After the pigment is included in the pulp slurry, it is well distributed therein by agitation, preferably mild agitation.

Pigment is incorporated in the slurry usually in an amount of from 0.1 to 5 to 10 percent by weight of the pulp basis the dry pulp weight. Even larger amounts of pigment are used, although primarily for the preparation of special types of papers.

Most of these pigmentary materials are of further value and provide excellent pigmented paper because they are well retained in the sheeted product. Upwards of 70 percent and often essentially all of the pigment incorporated in the aqueous pulp slurry is retained in the paper sheeted from the slurry. Pigmented papers contain from 0.1 to 10 percent siliceous pigment by weight of the paper as sheeted and dried, and exclusive of any coating that may be applied to the paper. More heavily pigmented papers, e.g., papers containing upwards of 10 percent and up to 30 percent siliceous pigment by weight, also may be provided.

The pigment is well dispersed in the sheeted paper. It may be regarded as distributed uniformly or essentially uniformly throughout the sheet in admixture with the other components, notably the cellulosic pulp.

Sheeted paper is usually regarded as a fibrous material comprised of non-oriented cellulosic pulp fibers. The pigment is well distributed between and around these individual fibers.

Paper comprised of all pulps susceptible generally regarded as suitable for sheeted paper are useful here. Thus, chemically treated pulp typified by sulfite, soda, or kraft pulp, semi-chemical pulp, or mechanically ground plup, or mixes thereof may comprise the pulp component. Besides virgin pulp, broke, i.e., cuttings and scraps of paper recovered from paper making operations, may constitute a portion of the cellulosic pulp.

Other paper manufacturing operations normally associated with the preparation of sheeted paper may also be practiced in conjunction with the use of these pigments in paper. Thus, the pigments are useful in sized or unsized paper. For sized paper, a rosin size such as a soluble alkali metal rosin soap, e.g., sodium resinate or other typical size is included in the pulp slurry and precipitated concurrently or prior to the addition of the pigment to the slurry by trivalent or tetravalent metals such as titanic sulfate or aluminum sulfate. Coloring matter may likewise be included during the feeding cycle.

The pulp may also be bleached by the addition of chlorine in an oxidizing form or by other recognized paper bleaching expedients. Generally, bleaching is accomplished prior to including the pigmentary materials in the pulp, although this is not essential.

In accordance with accepted paper manufacturing techniques, the pulp slurry in which the siliceous pigment is incorporated is sheeted into paper on a wire of a Fourdrinier or other paper forming apparatus. Subsequently, the paper may be calendered, dried, and if desired, coated in accordance with standard paper procedures.

It is desirable in preparing these pigmented papers that the pulp slurry be acidic, e.g., at pH 4 to 7, notably about pH 5, when sheeted. Acidifying agents such as aluminum sulfate may be included in the pulp slurry to render it sufficiently acidic. Other such materials as inorganic acids, notably the mineral acids, inorganic acid salts and the like also are acidifying agents. If the siliceous material includes a metal oxide or other impurities which by ion-exchange or other chemical interreactions react with aluminum sulfate or other acidifying agent, the chemical composition of the pigment may be somewhat altered. For example, the calcium oxide content of calcium silicate may be partially or completely reacted with the aluminum sulfate such that in the final paper it will be present in lesser concentrations basis the weight of the pigment dispersed in the paper. The aluminum sulfate will replace the calcium oxide in part or in whole and the pigment within the paper will be an alumina-silica composition.

This application is a continuation-in-part of application Serial No. 616,595, filed October 18, 1956, which application is a continuation-in-part of applications Serial No. 770,169, filed August 22, 1947; Serial No. 277,760, filed March 21, 1952, now abandoned; Serial No. 283,721, filed April 22, 1952, now United States Letters Patent 2,805,955; Serial No. 355,865, filed May 18, 1953, now United States Letters Patent 2,786,777; Serial No. 473,057, filed December 3, 1954, now United States Letters Patent 2,786,776; and is a continuation-in-part of application Serial No. 646,224, filed March 15, 1957, which application is a continuation-in-part of applications Serial No. 616,595, filed October 18, 1956; Serial No. 471,533, filed November 26, 1954, now United States Letters Patent 2,837,495; and Serial No. 473,057, filed December 3, 1954

The present invention has been described with specific reference to certain details, however, it will be understood that it is not intended that the invention be construed as limited to such details except insofar as they appear in the appended claims.

I claim:

1. Finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 55 percent by weight of the pigment flocs being below 7 microns.

2. Finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 75 percent by weight of the pigment flocs being below 7 microns.

3. Finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being between 0.025 and 0.25 micron, at least 75 percent by weight of the pigment flocs being below 7 microns.

4. Finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 55 percent by weight of the pigment flocs being below 7 microns and the preponderant weight of these flocs being in the range of 0.5 to 7 microns in size.

5. Finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being between 0.025 and 0.25 micron, at least 55 percent by weight of the pigment flocs being below 7 microns and the preponderant weight of these flocs being in the range of 0.5 to 7 microns in size.

6. Paper having dispersed therein finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 55 percent by weight of the pigment flocs being below 7 microns.

7. Paper having dispersed therein finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being between 0.025 and 0.25 micron, at least 55 percent by weight of the pigment flocs being below 7 microns.

8. Paper having dispersed therein finely divided, precipitated flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 75 percent by weight of the pigment flocs being below 7 microns.

9. Paper having dispersed therein finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being between 0.025 and 0.25 micron, at least 75 percent by weight of the pigment flocs being below 7 microns.

10. Finely divided precipitated flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 75 percent by weight of the pigment flocs being below 7 microns and the preponderant weight of these flocs being in the range of 0.5 to 7 microns in size.

11. Finely divided precipitated flocculated siliceous pigment, the pigment being in the form of flocs of ultimate particles, said flocs under high magnification visually resembling grape clusters, the individual grapes of which are representative of ultimate particles of siliceous material, the average size of the ultimate particles being between 0.025 and 0.25 micron, at least 75 percent by weight of the pigment flocs being below 7 microns and the preponderant weight of these flocs being in the range of 0.5 to 7 microns in size.

12. Paper having dispersed therein finely divided precipitated flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 75 percent by weight of the pigment flocs being below 7 microns and the preponderant weight of these flocs being in the range of 0.5 to 7 microns in size.

13. Paper having dispersed therein finely divided precipitated flocculated siliceous pigment, the pigment being in the form of flocs of ultimate particles, said flocs under high magnification visually resembling grape clusters, the individual grapes of which are representative of ultimate particles of siliceous material, the average size of the ultimate particles being between 0.025 and 0.25 micron, at least 75 percent by weight of the pigment flocs being below 7 microns and the preponderant weight of these flocs being in the range of 0.5 to 7 microns in size.

14. Finely divided precipitated flocculated siliceous pigment containing metal oxide other than $SiO_2$ and having 1 to 150 moles of $SiO_2$ per mole of its other metal oxide content, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 55 percent by weight of the pigment flocs being below 7 microns.

15. Finely divided precipitated flocculated siliceous pigment containing metal oxide other than $SiO_2$ and having 1 to 150 moles of $SiO_2$ per mole of its other metal oxide content, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 70 percent by weight of the pigment flocs being below 7 microns.

16. Paper having dispersed therein finely divided precipitated flocculated siliceous pigment containing metal oxide other than $SiO_2$ having 1 to 150 moles of $SiO_2$ per mole of its other metal oxide content, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 55 percent by weight of the pigment flocs being below 7 microns.

17. Paper having dispersed therein finely divided precipitated flocculated siliceous pigment containing metal oxide other than $SiO_2$ and having 1 to 150 moles of $SiO_2$ per mole of its other metal oxide content, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 70 percent by weight of the pigment flocs being below 7 microns.

18. A method of preparing paper which comprises forming paper from a pulp slurry containing finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 55 percent by weight of the pigment flocs being below 7 microns.

19. A method of preparing paper which comprises forming paper from a pulp slurry of finely divided precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 75 percent by weight of the pigment flocs being below 7 microns.

20. A method of preparing paper which comprises forming paper from a pulp slurry containing finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being between 0.025 and 0.25 micron, at least 75 percent by weight of the pigment flocs being below 7 microns.

21. A method of preparing paper which comprises forming paper from a pulp slurry containing finely divided, precipitated, flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 55 percent by weight of the pigment flocs being below 7 microns and the preponderant weight of these flocs being in the range of 0.5 to 7 microns in size.

22. A method of preparing paper which comprises forming paper from a pulp slurry containing finely divided, precipitated flocculated siliceous pigment, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 75 percent by weight of the pigment flocs being below 7 microns and the preponderant weight of these flocs being in the range of 0.5 to 7 microns in size.

23. A method of preparing paper which comprises forming paper from a pulp slurry containing finely divided, precipitated, flocculated siliceous pigment containing metal oxide other than $SiO_2$ and having 1 to 150 moles of $SiO_2$ per mole of its other metal oxide content, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 55 percent by weight of the pigment flocs being below 7 microns.

24. A method of preparing paper which comprises forming paper from a pulp slurry containing finely divided, precipitated flocculated siliceous pigment containing metal oxide other than $SiO_2$ and having 1 to 150 moles of $SiO_2$ per mole of its other metal oxide content, the pigment being in the form of flocs of ultimate particles, said flocs under high magnification visually resembling grape clusters, the individual grapes of which are representative of ultimate particles of siliceous material, the average size of the ultimate particles being less than 0.25 micron, at least 70 percent by weight of the pigment flocs being below 7 microns.

25. Finely divided, white, precipitated alumina-silica pigment having at least 6 moles of $SiO_2$ per mole of $Al_2O_3$, the pigment being in the form of flocs of ultimate particles, said flocs under high magnification visually resembling grape clusters, the individual grapes of which are representative of ultimate particles of siliceous material, the size of the ultimate particles being below 0.1 micron, at least 55 percent by weight of the pigment flocs being below 7 microns.

26. Finely divided, white, precipitated alumina-silica pigment having at least 6 moles of $SiO_2$ per mole of $Al_2O_3$, the pigment being in the form of flocs of ultimate particles, said flocs under high magnification visually resembling grape clusters, the individual grapes of which are representative of ultimate particles of siliceous material, the size of the ultimate particles being 0.05 to 0.1 micron, at least 70 to 95 percent by weight of the pigment flocs being below 7 microns.

27. Paper having dispersed therein finely divided, white, precipitated alumina-silica pigment having at least 6 moles of $SiO_2$ per mole of $Al_2O_3$, the pigment being in the form of flocs of ultimate particles, said flocs under high magnification visually resembling grape clusters, the individual grapes of which are representative of ultimate particles of siliceous material, the size of the ultimate particles being below 0.1 micron, at least 55 percent by weight of the pigment flocs being below 7 microns.

28. Paper having dispersed therein finely divided, white, precipitated alumina-silica pigment having at least 6 moles of $SiO_2$ per mole of $Al_2O_3$, the pigment being in the form of flocs of ultimate particles, said flocs under high magnification visually resembling grape clusters, the individual grapes of which are representative of ultimate particles of siliceous material, the size of the ultimate particles being 0.05 to 0.1 micron, at least 70 to 95 percent by weight of the pigment flocs being below 7 microns.

29. The pigment of claim 25 wherein the pigment contains 6 to 100 moles of $SiO_2$ per mole of $Al_2O_3$.

30. The pigment of claim 26 wherein the preponderant weight of the pigment flocs is in the range of 0.5 to 7 microns in size.

31. The paper of claim 27 wherein the silica pigment contains 6 to 100 moles of $SiO_2$ per mole of $Al_2O_3$.

32. The paper of claim 28 wherein the silica pigment contains 6 to 100 moles of $SiO_2$ per mole of $Al_2O_3$.

33. Finely divided, white, precipitated alumina-silica pigment having at least 6 moles of $SiO_2$ per mole of $Al_2O_3$, the pigment being in the form of flocs of ultimate particles, said flocs under high magnification visually resembling grape clusters, the individual grapes of which are representative of ultimate particles of siliceous material, the size of the ultimate particles being below 0.25 micron, at least 55 percent by weight of the pigment flocs being below 7 microns.

34. Finely divided, white, precipitated alumina-silica pigment having at least 6 moles of $SiO_2$ per mole of $Al_2O_3$, the pigment being in the form of flocs of ultimate particles, said flocs under high magnification visually resembling grape clusters, the individual grapes of which are representative of ultimate particles of siliceous material, the size of the ultimate particles being 0.05 to 0.25 micron, at least 70 to 95 percent by weight of the pigment flocs being below 7 microns.

References Cited in the file of this patent

UNITED STATES PATENTS 2,805,955   Allen _____ Sept. 10, 1957